July 20, 1954 H. R. REISS 2,684,437
SIGNAL TRANSMITTING CIRCUIT
Filed Nov. 25, 1949
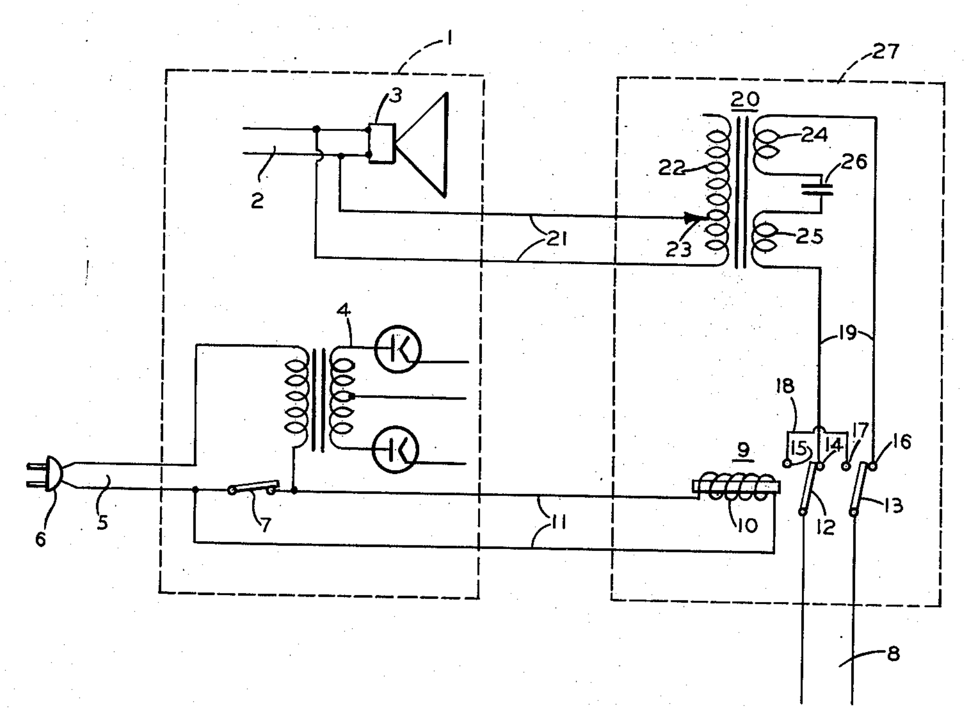
INVENTOR
HAROLD R. REISS
BY HIS ATTORNEYS
Howson & Howson Patented July 20, 1954 2,684,437

UNITED STATES PATENT OFFICE 2,684,437

SIGNAL TRANSMITTING CIRCUIT

Harold R. Reiss, Philadelphia, Pa.

Application November 25, 1949, Serial No. 129,409

5 Claims. (Cl. 250—15)

This invention relates to novel circuits for use in a system of the character disclosed and claimed in my prior application Serial No. 16,196, filed March 22, 1948, now abandoned, which system is adapted to determine or measure public reaction to radio and television broadcasts. In such system, audio signals are transmitted in any suitable manner from certain representative radio or television receivers to a central or monitoring station where they are compared with audio signals received via carrier transmission directly from broadcasting stations. By means of such a system it is possible to determine at any time whether or not each monitored receiver is in operation and, if so, the broadcasting station to which it is tuned.

The principal object of the present invention is to provide novel circuit arrangements for use in conjunction with each of the monitored receivers, in a system of the character abovementioned, to transmit the audio signal from each receiver to the monitoring station, and to give a positive indication if the receiver is not in operation.

Another object of the invention is to provide circuit arrangements which have various advantages as hereinafter set forth.

This application is a continuation-in-part of the above-mentioned prior application.

The invention may be fully understood from the following detailed description with reference to the accompanying drawing, wherein the Figure 1 is a diagrammatic illustration of a preferred embodiment of the invention.

Referring to the drawing, there is represented at 1 a conventional radio or television receiver having the usual audio output circuit 2 leading to the loudspeaker 3, and also having the usual power supply represented schematically at 4, to which the power supply circuit 5 extends, usually from a conventional plug 6, the circuit 5 being controlled by the on-off switch 7. For the purpose of disclosure of the present invention it is unnecessary to illustrate or consider any of the other components of the radio or television receiver represented at 1. It is assumed, of course, that the receiver represented is one of the monitored receivers in a system of the character above mentioned.

In accordance with the present invention, there are provided, in combination with the receiver 1, means for transmitting the audio signal from the receiver output circuit 2 to the central or monitoring station, and means controlled by, or responsive to, operative and inoperative conditions of the receiver to condition said transmitting means for transmission of said audio signal when the receiver is in operation.

In the embodiment of the figure the transmission means comprises a transmission line or circuit 8 which extends to the central or monitoring station (not shown), and an arrangement is provided for effecting connection of the line 8 to the receiver output circuit 2 only when the receiver is in operation, as hereinafter described. At the central or monitoring station there may be provided an automatic selector switch adapted to step from line to line in order that the audio signal components received from the monitored receivers may be successively compared with the audio signal components received directly from the broadcasting stations.

In the embodiment of the figure, an arrangement is provided whereby the closing and opening of the power supply switch 7 causes connection of the transmission circuit 8 to, and disconnection thereof from, the audio output circuit 2 of the receiver. However, the invention contemplates the control of the transmission means from any portion of the radio receiver to condition the transmission means for transmission of the audio signal when the receiver is in operation.

Where a transmission line is employed, as in the figure, the line may be short-circuited when the receiver is not in operation, as described more fully hereinafter. This has certain advantages, as will be seen later.

In the embodiment of the figure, there is provided a relay 9 whose winding 10 is connected in shunt relation with the switch 7 by means of connections 11. The relay has two movable contacts 12 and 13, and four stationary contacts 14, 15, 16 and 17. The movable contact 12 moves between contacts 14 and 15, while the movable contact 13 moves between contacts 16 and 17. The movable contacts are biased toward contacts 14 and 16, in any suitable manner. Therefore, when the relay is deenergized the movable contacts 12 and 13 are in engagement with contacts 14 and 16 respectively. A short-circuiting connection 18 extends between the contacts 15 and 17, so that when the relay 9 is energized, a short circuit is placed across the end of the transmission circuit 8.

The contacts 14 and 16 are electrically connected to the audio output circuit 2 of the receiver 1 through connections 19, transformer 20, and connections 21. Consequently, when the relay 9 is deenergized, the transmission circuit 8 is connected to the audio output circuit 2 and the audio signal is supplied to the transmission circuit 8 through the transformer. Preferably the primary 22 of transformer 20 is provided with an adjustable tap 23 so that the transformer ratio may be varied at will. The secondary of the transformer is preferably divided into two sections 24 and 25, and a condenser 26 is connected between said sections in series therewith. The capacitance of this condenser is such that it readily permits the flow of audio frequency current, but it prevents flow of any d. c. current which might get onto the line 8 at the monitoring station.

The relay 9 and the transformer 20 may conveniently be disposed in a common casing or housing 27, thus providing a unit to which the connections 11 and 21 and the transmission line 8 may extend.

Considering the operation of the circuit, when the switch 7 is open the relay 9 is energized and therefore the transmission circuit 8 is short-circuited. This will be indicated at the monitoring station where the automatic selector will step to the next line in response to the short-circuited condition of the line 8. It should be noted that in the "off" condition of the receiver 1, there is a completed circuit through the primary of the power supply transformer, but the impedance of the relay winding 10 is sufficiently high so that there is not enough voltage across the primary of the power supply transformer to cause operation of the receiver.

When the switch 7 is closed, it short circuits the winding of relay 9, thereby effectively de-energizing the relay and placing the full power supply voltage across the primary of the power supply transformer so that the receiver is placed in operation. The deenergizing of the relay 9 causes the transmission circuit 8 to be electrically connected to the audio output circuit 2 of the receiver. Therefore, during operation of the receiver the audio output voltage is applied to the transmission circuit 8 and is thus available at the monitoring station when the selector steps onto the line 8.

The circuit arrangement above described has various advantages. As set forth above, it gives positive indication as to whether the receiver is on or off, and it is adapted to cause automatic stepping of the selector at the monitoring station if the receiver is in the off condition. Furthermore, if it happens that the plug 6 has been pulled out of the associated socket, this will be indicated by the fact that the transmission circuit 8 is neither short-circuited nor has an audio signal voltage thereon. A further advantage of the system is that it enables fine adjustment of the coupling between the audio output circuit and the transmission circuit. Moreover, there is insignificant power drain on the output circuit of the receiver since the effective impedance of the circuit may be such as to draw very little current. It should be noted further that the short circuiting of the line 8 enables checking of the line by measuring the resistance to the short circuit when the receiver is in the off condition.

While a certain embodiment of the invention has illustrated and described, it will be understood that the invention is not limited thereto but is capable of various other embodiments and modifications.

I claim:

1. The combination with a broadcast receiver having an audio output circuit, of a transmission circuit for transmitting the audio output of said receiver to a location remote from said receiver, and means including a relay responsive to operative and inoperative conditions respectively of said receiver for connecting said transmission circuit to said audio output circuit when the receiver is operative, and for placing a short circuit across said transmission circuit when the receiver is inoperative.

2. The combination with a broadcast receiver having provision for receiving an audio signal component and also having a power supply circuit including a manual switch, of means for transmitting the audio signal from said receiver to a location remote from said receiver, and means including a relay connected in shunt relation with said switch to condition said transmitting means for transmission of said audio signal whenever said switch is closed, said relay having sufficiently high impedance to prevent operation of the receiver when said switch is open.

3. The combination with a broadcast receiver having an audio output circuit and a power supply circuit including a manual switch, of a transmission circuit for transmitting the audio output of said receiver to a location remote from said receiver, and means including a relay connected in shunt relation with said switch for connecting said transmission circuit to said audio output circuit when said switch is closed, and for disconnecting said transmission circuit from said audio output circuit when said switch is open, said relay having sufficiently high impedance to prevent operation of the receiver when said switch is open.

4. The combination with a broadcast receiver having an audio output circuit and a power supply circuit including a manual switch, of a transmission circuit for transmitting the audio output of said receiver to a location remote from said receiver, and means including a relay connected in shunt relation with said switch for connecting said transmission circuit to said audio output circuit when said switch is closed, and for placing a short circuit across said transmission circuit when said switch is open, said relay having sufficiently high impedance to prevent operation of the receiver when said switch is open.

5. The combination with a broadcast receiver having an audio output circuit, of a transmission circuit for transmitting the audio output of said receiver to a location remote from said receiver, a variable-ratio coupling transformer having its primary connected to said audio output circuit, and means including a relay responsive to operative and inoperative conditions respectively of said receiver for connecting said transmission circuit to the secondary of said transformer when the receiver is operative, and for placing a short circuit across said transmission circuit when the receiver is inoperative.

References Cited in the file of this patent

UNITED STATES PATENTS

| Number | Name | Date |
|---|---|---|
| 2,096,109 | Hopkins | Oct. 19, 1937 |
| 2,188,165 | Thomas | Jan. 23, 1940 |
| 2,213,886 | Potter | Sept. 3, 1940 |
| 2,292,222 | Haigis | Aug. 4, 1942 |
| 2,344,562 | Potter | Mar. 21, 1944 |
| 2,354,836 | Rusch | Aug. 1, 1944 |
| 2,369,193 | Vrooman | Feb. 13, 1945 |
| 2,479,548 | Young | Aug. 16, 1949 |
| 2,630,366 | Rahmel | Mar. 3, 1952 |

FOREIGN PATENTS

| Number | Country | Date |
|---|---|---|
| 337,469 | Great Britain | Nov. 3, 1930 |

OTHER REFERENCES

"Radiovoting," by H. J. Bernard, Radio World, pages 33 to 39, May 1937.